US009061841B2

(12) United States Patent
Baker et al.

(10) Patent No.: US 9,061,841 B2
(45) Date of Patent: Jun. 23, 2015

(54) STACKING DEVICE

(75) Inventors: Martin Baker, Somerset (GB);
Guillaume Gourves, Somerset (GB)

(73) Assignee: TMB PATTERNS LIMITED,
Bridgwater Somerset (GB)

(*) Notice: Subject to any disclaimer, the term of this patent is extended or adjusted under 35 U.S.C. 154(b) by 313 days.

(21) Appl. No.: 13/119,436

(22) PCT Filed: Sep. 3, 2009

(86) PCT No.: PCT/GB2009/002117
§ 371 (c)(1),
(2), (4) Date: Mar. 17, 2011

(87) PCT Pub. No.: WO2010/031990
PCT Pub. Date: Mar. 25, 2010

(65) Prior Publication Data
US 2011/0200418 A1    Aug. 18, 2011

(30) Foreign Application Priority Data

Sep. 17, 2008  (GB) .................................. 0817016.9

(51) Int. Cl.
*B65G 57/30*     (2006.01)
*B65H 33/06*     (2006.01)

(52) U.S. Cl.
CPC .... *B65G 57/302* (2013.01); *B65H 2301/42122* (2013.01); *B65H 33/06* (2013.01)

(58) Field of Classification Search
CPC .. B65G 57/302; B65G 1/0492; B65G 57/303; B65B 35/52; B65B 11/20; B65B 13/10; B65B 27/08; Y10S 414/102
USPC ............... 211/13.1, 150, 41.1, 59.3; 294/113; 312/35, 42; 414/794.9, 795, 795.1, 414/795.2, 795.3, 797.4, 797.5, 797.6, 414/797.7, 798, 798.4, 798.8, 923
See application file for complete search history.

(56) References Cited

U.S. PATENT DOCUMENTS

| | | | | |
|---|---|---|---|---|
| 1,946,652 A | * | 2/1934 | Wallgren | 384/127 |
| 2,792,950 A | * | 5/1957 | Fenton et al. | 414/795.3 |
| 3,112,038 A | * | 11/1963 | Breivik | 414/788.2 |
| 3,220,570 A | * | 11/1965 | Swanson et al. | 414/789.8 |
| 3,310,183 A | * | 3/1967 | Paquette | 414/789.9 |
| 3,363,781 A | * | 1/1968 | Magnetti | 414/788.8 |
| 3,870,166 A | * | 3/1975 | Tull, III | 414/790.3 |

(Continued)

FOREIGN PATENT DOCUMENTS

| | | | | |
|---|---|---|---|---|
| DE | 19825517 A1 | * | 7/1999 | ............ B65G 57/30 |
| DE | 198 49 391 | | 5/2000 | |

(Continued)

*Primary Examiner* — Gregory Adams
(74) *Attorney, Agent, or Firm* — Tarolli, Sundheim, Covell & Tummino LLP

(57) ABSTRACT

A stacking device for assembling a slack of uniformly sized articles 1, has a receiving station for successively receiving said articles 1, and a lifting means to raise said articles from the receiving station to a stacking station The stacking station includes catching means 3 to catch and retain the articles in the stacking station, the catching means comprising at least two catchers 3 located on opposite sides of the station to engage opposite side edges of the article. The article 1 when being raised contacts the catchers 3 to displace the catchers to a closed position to enable the article to override the catchers 3 to move to a position above the catchers 3, the catchers 3 having biassing means to bias the catchers 3 back to an open position to engage and support the article 1 in the stacking station when the lifting means is withdrawn. The catchers 3 have a uniform cross-section and are pivotally mounted in a frame member 5 having a uniform cross-section.

20 Claims, 4 Drawing Sheets

(56) References Cited

U.S. PATENT DOCUMENTS 5,127,543 A * 7/1992 Meisels ............................ 221/4
5,674,047 A * 10/1997 Lapeus et al. .............. 414/795.6
6,488,463 B1 * 12/2002 Harris ...................... 414/331.14

FOREIGN PATENT DOCUMENTS

| | | | |
|---|---|---|---|
| DE | 20 2005 014 323 | 12/2005 | |
| EP | 0 137 570 | 4/1985 | |
| EP | 1 262 428 | 12/2002 | |
| GB | 2 394 466 | 4/2004 | |
| JP | 57203616 | 12/1982 | |
| JP | 62046815 A * | 2/1987 | ............. B65G 57/30 |
| JP | 2000233832 A * | 8/2000 | ............. B65G 60/00 |
| JP | 2000289855 | 10/2000 | |
| JP | 2001122439 A * | 5/2001 | ............. B65G 57/30 |
| WO | WO 2007/007418 | 1/2007 | |

* cited by examiner

STACKING DEVICE

TECHNICAL FIELD

The present invention relates to a stacking device for use in stacking machines for forming a stack of a plurality of substantially identically shaped and sized articles.

The inventions is particularly, but not exclusively, advantageous for forming a nested stack of trays formed of a relatively thin plastics material it is desirable to assemble the trays in a nested stack to minimise their volume for storage and transportation purposes.

BACKGROUND OF THE INVENTION

Stacking devices for this purpose are known and generally consist of a receiving station for successively receiving the articles with lifting means located below the receiving station to raise the articles to a stacking station. These stacking stations include catching means to catch and hold the articles in the stacking station. Typically, the receiving station will have a plurality of lifting devices arranged in parallel and means for advancing a continuous stream of articles into the receiving station. In this way, a plurality of stacks can be assembled simultaneously. These stacking station includes catching means so that when the lifting devices are retracted downwardly, the raised article engages the catchers and is thereby supported in the stacking station. When a predetermined number of articles are assembled in the stack, the stack is removed from the stacking station to enable a fresh stack to be assembled.

Each stacking station includes at least two catchers, which are arranged to engage on opposite sides of the article. Particular articles may require more than two catchers. A known form of catcher consists of a stainless steel resilient finger or plate which is arranged to be biased into the path of a tray as it is lifted so that the tray displaces the finger on its upward path and then when the tray is past the finger, the finger springs back into its normal position in the path of the tray so that when the lifter is lowered the tray is retained by the fingers in the stacking station. This arrangement is generally effective but has the disadvantage that the finger must be relatively thin to provide the necessary slight resilience but without being stiff enough to damage the tray as it passes. The finger inevitably has a sharp edge which engages the tray and which can cause damage to the trays. Also engagement of the trays is not entirely reliable. This design has the further disadvantage that the resilient fingers can break relatively easily, causing damage to the machine and, subsequently, a great deal of downtime while the machine is repaired. Furthermore, the stainless steel fingers have to be secured to the frame by screws or rivets which makes assembly of the machine quite expensive and repairs time-consuming.

Another type of catcher which addresses these problems is disclosed in GB Patent 2,394,466 B. The type of catcher disclosed in this specification has an elongate catcher element formed of a resilient plastics material which is secured to the stacking station framework by resilient plugs. Although this is an improvement on the stainless steel fingers, it does have the drawback that the catches can be dislodged in the framework when the plugs wear out or become fatigued, which again can cause damage to the articles, necessitating downtime and repair of the machine. Since the entire catcher lies in the path of the articles, damage can occur to the articles.

The present invention seeks to provide a solution to these problems.

SUMMARY OF THE INVENTION

According to the present invention there is provided a stacking device for assembling a stack of uniformly sized articles, including a receiving station for successively receiving said articles, lifting means to raise said articles from the receiving station to a stacking station, the stacking station including catching means to catch and retain the articles in the stacking station, the catching means comprising at least two catchers located on opposite sides of the station to engage opposite side edges of the article, the article when being raised contacting the catchers to displace the catchers to a closed position to enable the article to override the catchers to move to a position above the catchers, the catchers having biassing means to bias the catchers to an open position to engage and support the article in the stacking station when the lifting means is withdrawn, the catchers having a substantially uniform cross-section and being pivotally mounted in a frame member having a substantially uniform cross-section.

Preferably, the catchers each have an elongate article engaging face extending substantially along the length of the article.

The catching means and/or the frame member may be formed of extruded aluminium or plastics material, in which case, the catchers are preferably assembled to the stacking station by sliding longitudinally into the associated frame member.

In a preferred embodiment, each catcher has an arcuate supporting surface which rests in an associated arcuate recess in the frame member to enable the catcher to pivot between said closed and open positions. The radius of the arcuate supporting surface on the catcher may be substantially identical to the radius of the recess in the frame member, but alternatively the radius of the arcuate recess in the frame member may be larger than the radius of the catcher arcuate supporting surface.

Preferably, in the closed position, each catcher lies within the profile of the frame member and has a planar surface facing the articles which lies substantially flush with the surface of the frame member when in a retracted position.

In a preferred arrangement, the tray supporting surface of each catcher is arcuate, the radius of the arc being struck from the pivot axis of the catcher, and adjacent the said tray supporting surface, each catcher may include a shoulder engageable with the frame member to define the open position of the catcher.

The blessing means may comprise a spring means, which may comprise a coil, leaf, or wave spring.

Preferably, the spring means is located in a recess in the frame member to act between the frame member and to the rear face of the catcher and may be secured to the rear face of the catcher and biassed into engagement with the frame member.

In another embodiment, the or each catcher is pivotaliy located on a pin located in and extending along the length of the associated frame member.

In a preferred arrangement, the stacking device is adapted to stack articles comprising containers in the form of trays having an outwardly extending peripheral rim adapted to co-operate with said catchers to form a stack of nested containers.

BRIEF DESCRIPTION OF THE DRAWINGS

A preferred embodiment of the invention will now be described by way of example with reference to the accompanying drawings, in which:—

DESCRIPTION OF EMBODIMENTS

Figure 1:
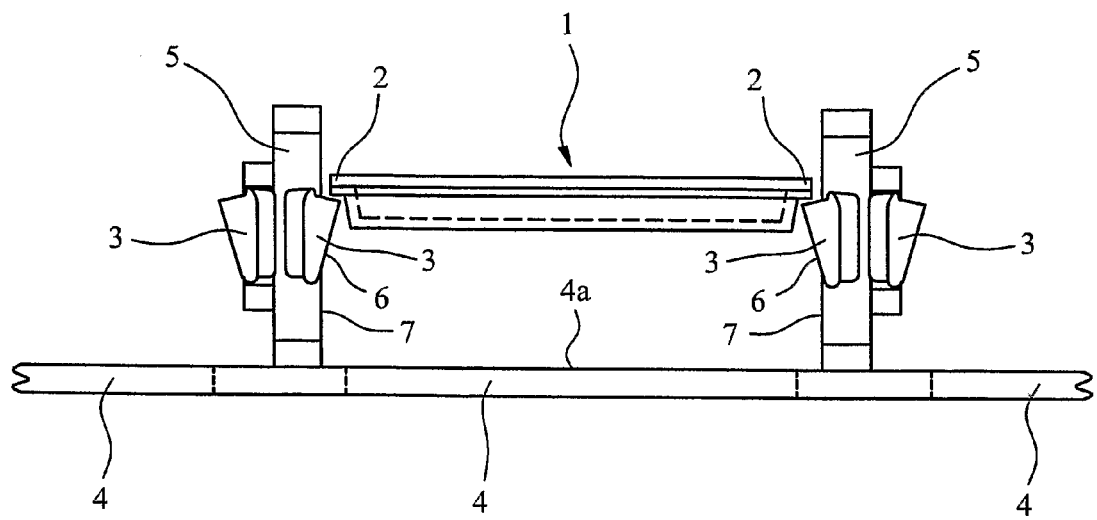
FIG. 1 shows a schematic side view or a stacking device.

Referring now in particular to FIG. 1, there is shown a schematic end view of a stacking station for producing a stack of nested trays 1, two of which are shown. Each tray is formed of a plastics material and is moulded from sheet material to form a shallow container with an outwardly extending peripheral rim 2 which is adapted to engage catchers 3 in the stacking station.

In the manufacturing process, the trays are transferred from a moulding station to a receiving section of the stacking device, where they are supported by their peripheral rim resting on the periphery of an opening 4 in the supporting surface 4a of the receiving section. Lifting means (not shown) in the form of a ram lifts the tray 1 upwardly to a stacking station. The stacking station includes an opposed pair of catchers 3 which are pivotally located in associated frame members 5 so as to be pivotal between an open position as shown in FIG. 1 and a closed position in which their surface 6 facing the trays lies substantially flush with the inner surface 7 of their associated frame member 5. The function of the catchers will be described in greater detail hereinafter.

As shown, each frame member carries two catchers 3 on opposed sides. The whole stacking apparatus consists of an array of stacking stations, typically arranged in an array of six or eight such stations operating in parallel but only one is shown for ease of explanation. The other stations are essentially identical to this station described and enable a plurality of stacks of containers to be prepared simultaneously.

Figure 2:
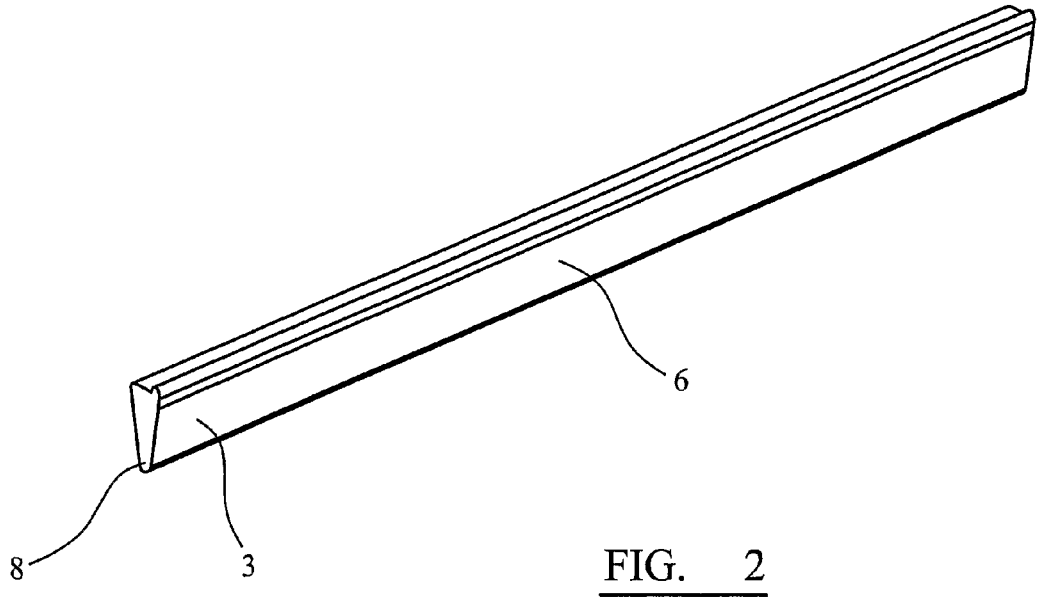
FIG. 2 shows a perspective view of a catcher.
Figure 4:
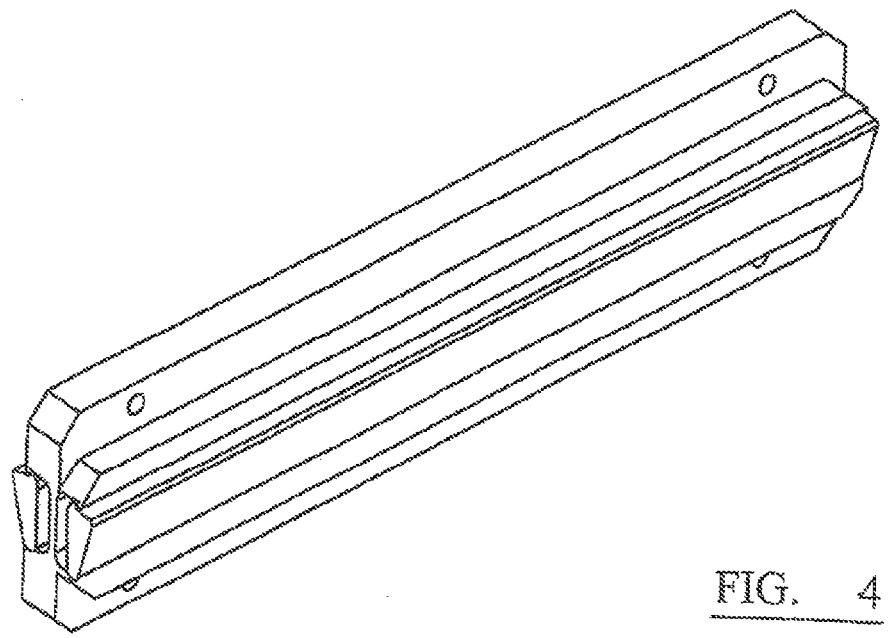
FIG. 4 shows a perspective view of the frame member carrying two catchers.

Referring now to the remaining figures, it can be seen that each catcher 3, as shown in FIG. 2 and FIG. 4 in particular, consists of an elongate member of uniform cross-section, typically formed of an aluminium extrusion. Similarly, the frame members 5 illustrated, particularly in FIGS. 5 and 6, also consist of aluminium extrusions of uniform cross-section. It is envisaged that in certain circumstances, these frame members 5 and/or the catchers 3 may be formed of an extruded plastics material.

Figure 3:
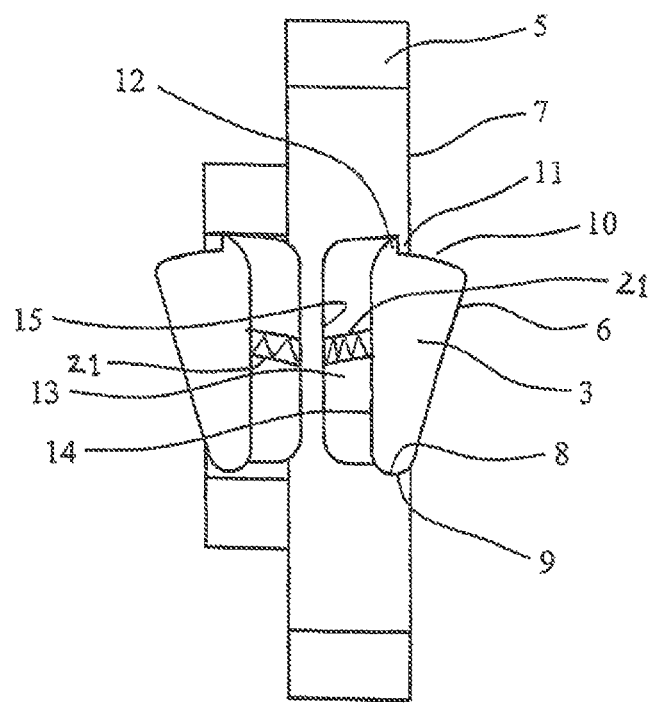
FIG. 3 shows an interview off a frame member carrying two catchers.

Referring now to FIG. 3 in particular, there is shown a cross-section of a catcher 3 and associated frame member 5. Each catcher 3 at its lower end has an arcuate supporting surface 8 which engages in a recess 9 in the frame member 5 which has a radius substantially identical to the radius of the lower end 8 of the catcher 3, so that the catcher 3 pivots in the frame member 5. It is envisaged that the recess 9 in the frame member may have a slightly larger radius than the radius on the container 3 to provide a line contact between the two members which would reduce frictional losses. The catcher 3 is located in the frame member 5 in such a way that when it is biased to the closed position by the passage of a tray, the outer surface 6 of the catcher lies substantially flush with the planar surface 7 of the frame member to substantially reduce the risk of articles 1 being damaged when passing the catcher 3. At its upper end, each catcher 3 has an arcuate surface 10 which has a radius struck about the pivot axis of the catcher 3. In this way, only a very small clearance gap is formed between the surface 10 and the adjacent abutting surface on a rib 11 of the frame member 5. Adjacent to the arcuate surface 10 of the catcher 3 there is provided a shoulder 12 which ahufs the rib 11 on the frame member 5 which thereby determines and limits the open position of the catcher 3.

Formed within the frame member 5 behind the catcher 3, there is a recess 13 within which is located biasing means 21, which is typically in the form of a spring such as a coil, leaf or wave spring formed of metal or plastics, although it is also envisaged that a form of rubber spring may be provided. This spring 21 is preferably secured to the rear face 14 of the catcher 3 and biased info contact with the opposing wail 15 of the recess to bias the catcher outwardly into the open, catching position. In this way, if the spring 21 should become worn or damaged, repair is quite easy to effect by withdrawing the catcher 3, which slides longitudinally into and out of the frame member 5, and simply replacing it with a new catcher 3.

Figure 5:
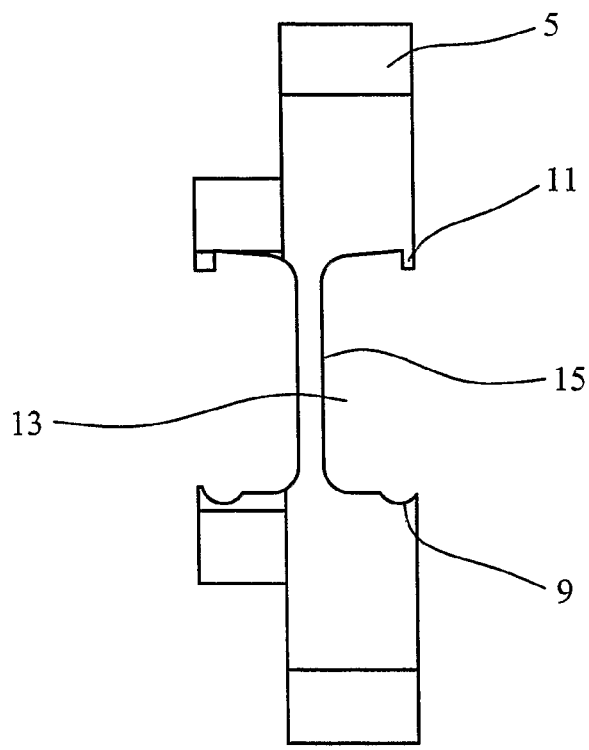
FIG. 5 shows an end view of the frame member.
Figure 6:
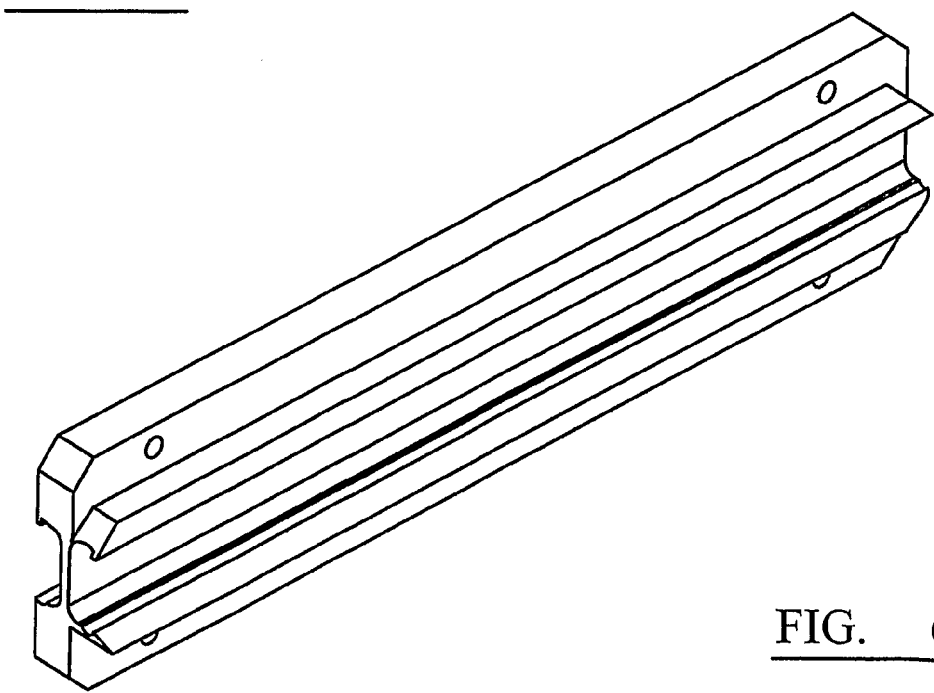
FIG. 6 shows a perspective view of the frame member.

FIG. 5 shows more dearly the cross-section of the frame member 5 with the arcuate surface 9 and the depending rib 11 forming the abutting surface for the arcuate surface 10 of the catcher 3 and the abutment for the shoulder 12 on the catcher. It can thus be seen that the catcher is assembled to the frame member by sliding the catcher 3 longitudinally into the frame member 5. The provision of the arcuate surface 9 which locates the lower end of the catcher 3 and the depending rib 11 on the upper part of the catcher receiving opening, means that the catcher 3 cannot inadvertently come out of the frame member 5 into the path of the containers. This is an advantage of using rigid extrusions.

Figure 7:
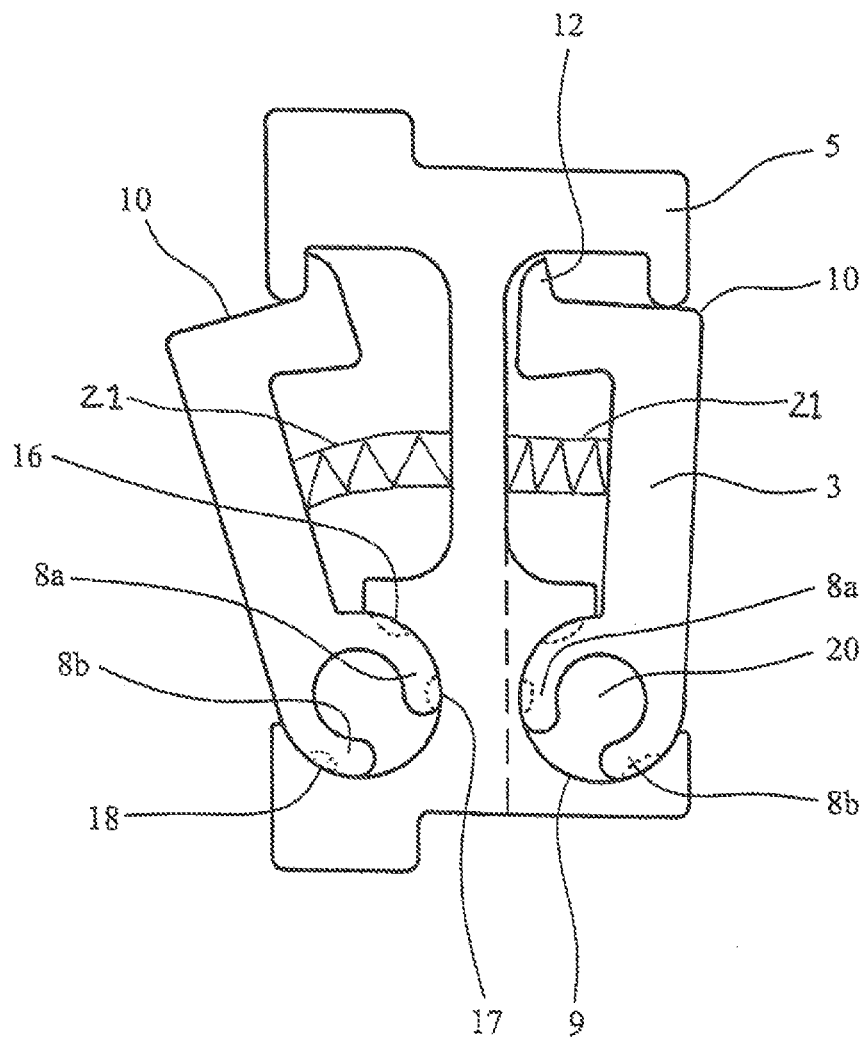
FIG. 7 shows an end view of an alternative construction of a frame member and two catchers.

Referring now to FIG. 7, there is shown an alternative cross-sectional profile for the catcher 3 and the frame member 5. The catcher 3 is of lighter construction, having a thinner centre section. At its pivoting end, the catcher 3 has two arcuate arms curved towards each other which are located in an arcuate recess having substantially the same radius and extending over more than 180°. In a modification of this design, the arcuate recess has three 16, 17 and 18 protuberances extending the length of the frame member 5 and distributed about the recess to provide three line contacts for the catcher 3. In this way, frictional losses when the catcher is pivoted are reduced. This arrangement with the line contact and the lighter construction reduces the operating loads on the return spring and on the container being stacked which has to displace the catcher 3. In another embodiment, the lower part of the frame is cut away as shown in dotted outline 19 and the catcher is mounted on a rod 20 located in the interior arcuate recess between the curved arms 8a and 8b. The rod 20 is secured either to the frame member 5 at its ends or to the main framework of the stacking station. The rod 20 or the arms 8a and 8b may also have line protuberances similar to the protuberances 16, 17 and 18, to reduce friction. In another form, the rod is a force fit in the catcher 3 and is mounted for pivotal movement in bearings in the main structure or attached to the frame member 5.

The invention claimed is:

1. A stacking device for assembling a stack of uniformly sized articles, including a receiving station for successively receiving said articles, lifting means to raise said articles from the receiving station to a stacking station, the stacking station including catching means to catch and retain the articles in the stacking station, the catching means comprising at least two catchers located on opposite sides of the stacking station to engage opposite side edges of the article, each catcher having an elongate article engaging face extending substantially along the length of the article, the article when being raised contacting the catchers to displace the catchers to a closed position to enable the article to override the catchers to move to a position above the catchers, the catchers being biased to an open position to engage and support the article in the stacking station when the lifting means is withdrawn, the catchers having a substantially uniform cross-section and being pivotally mounted in a frame member having a substantially uniform cross-section, wherein, in the closed position, each catcher lying within the profile of the frame member and having a planar surface facing the article that lies substantially flush with the surface of the frame member facing the article.

2. A stacking device according to claim 1, wherein at least one of the catching means and the frame member is formed of extruded aluminum.

3. A stacking device according to claim 1, in which the catchers are slidable longitudinally into the associated frame member to assemble the catchers in the stacking station.

4. A stacking device according to claim 1, in which each catcher has an arcuate supporting surface which rests in an associated arcuate recess in the frame member to enable the catcher to pivot between said closed and open positions.

5. A stacking device according to claim 4, wherein the radius of the arcuate supporting surface on the catcher is substantially identical to the radius of the recess in the frame member.

6. A stacking device according to claim 4, wherein the radius of the arcuate recess in the frame member is larger than the radius of the catcher arcuate supporting surface.

7. A stacking device according to claim 1, wherein the tray supporting surface of each catcher is arcuate, the radius of the arc being struck from the pivot axis of the catcher.

8. A stacking device according to claim 7, wherein adjacent the tray supporting surface, each catcher includes a shoulder engageable with the frame member to define the open position of the catcher.

9. A stacking device according to claim 1, wherein at least one of the catching means and the frame member is formed of a plastic material.

10. A stacking device according to claim 1, wherein, in the closed position, each catch lies entirely within the profile of the frame member.

11. A stacking device according to claim 1, in which each catcher has a longitudinal dimension along which is provided an arcuate supporting surface which rests in an associated arcuate recess in the frame member, wherein said arcuate recess has a respective longitudinal dimension to enable the catcher to pivot between said closed and open positions along said abutting and respective arcuate surfaces.

12. A stacking device for assembling a stack of uniformly sized articles, including a receiving station for successively receiving the articles and lifting means to raise the articles from the receiving station to a stacking station, the stacking station comprising:

a pair of frame members each having an arcuate recess extending along the length of the frame member;

catching means to catch and retain the articles in the stacking station, the catching means comprising a pair of catchers located on opposite sides of the stacking station to engage opposite side edges of the article, each catcher having an arcuate surface and being insertable into the arcuate recess of a corresponding frame member in a direction extending along the length of the frame member to pivotally connect the catcher to the frame member, each catcher extending substantially along the length of the article; and wherein the catchers are biased to an open position for engaging and supporting the article in the stacking station when the lifting means is withdrawn;

the article, when being raised, contacting and displacing the catchers to a closed position enabling the article to override the catchers and move to a position above the catchers.

13. A stacking device according to claim 12, in which each catcher has a longitudinal dimension along which is provided an arcuate supporting surface which rests in an associated arcuate recess in the frame member, wherein said arcuate recess has a respective longitudinal dimension to enable the catcher to pivot between said closed and open positions along said abutting and respective arcuate surfaces.

14. A stacking device according to claim 12, wherein at least one of the catching means and the frame member is formed of extruded aluminium.

15. A stacking device according to claim 12, wherein the radius of the arcuate supporting surface on the catcher is substantially identical to the radius of the recess in the frame member.

16. A stacking device according to claim 12, wherein the radius of the arcuate recess in the frame member is larger than the radius of the catcher arcuate supporting surface.

17. A stacking device according to claim 12, wherein the tray supporting surface of each catcher is arcuate, the radius of the arc being struck from the pivot axis of the catcher.

18. A stacking device according to claim 12, wherein adjacent the tray supporting surface, each catcher includes a shoulder engageable with the frame member to define the open position of the catcher.

19. A stacking device according to claim 12, wherein at least one of the catching means and the frame member is formed of a plastic material.

20. A stacking device according to claim 12, wherein, in the closed position, each catch lies entirely within the profile of the frame member.

* * * * *